United States Patent
Keusch

[15] 3,635,110
[45] Jan. 18, 1972

[54] TAPE-CUTTING AND CONTACT FEED MECHANISM
[72] Inventor: Andre Keusch, Montreal, Quebec, Canada
[73] Assignee: Northern Electric Company Limited, Montreal, Quebec, Canada
[22] Filed: Apr. 22, 1970
[21] Appl. No.: 30,737

[52] U.S. Cl.................83/149, 83/150, 83/165, 83/389, 83/580, 83/588, 29/630, 219/79
[51] Int. Cl..................................................B26d 5/20
[58] Field of Search..................83/112, 149, 150, 165, 389, 83/382, 580, 588; 29/630; 219/79, 80

[56] References Cited

UNITED STATES PATENTS 3,010,350  11/1961  Kavinski ........................ 83/149 X
3,307,440   3/1967  Hoyt ............................. 83/150 X
3,322,013   5/1967  Felix ............................. 83/588 X Primary Examiner—James M. Meister
Attorney—Philip J. Erickson

[57] ABSTRACT

A cutting and feeding device for severing very small segments of predetermined length from a strip of feed material with a minimum of burring and feeding the small segments to a subsequent processing operation in a desired orientation. A reciprocating knife edge cooperates with a fixed knife edge to cut the small pieces from a strip fed into the cutter, and to advance the small pieces into a curved guide which guides the pieces through 90°. A reciprocating finger, synchronized with the cutters, pushes the pieces around the curved guide for delivery to the next operation. The device is particularly suitable for cutting precious metal electrical contacts for subsequent welding to a conductor strip.

19 Claims, 13 Drawing Figures

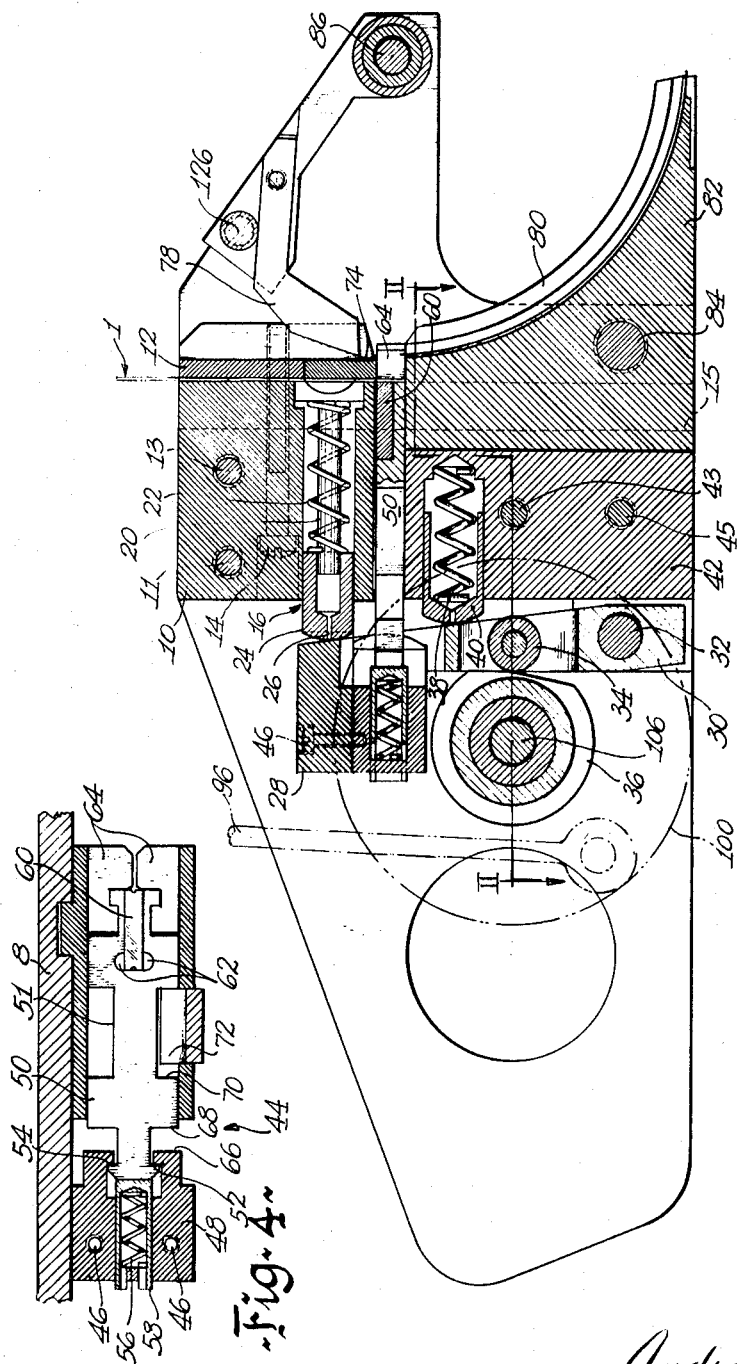

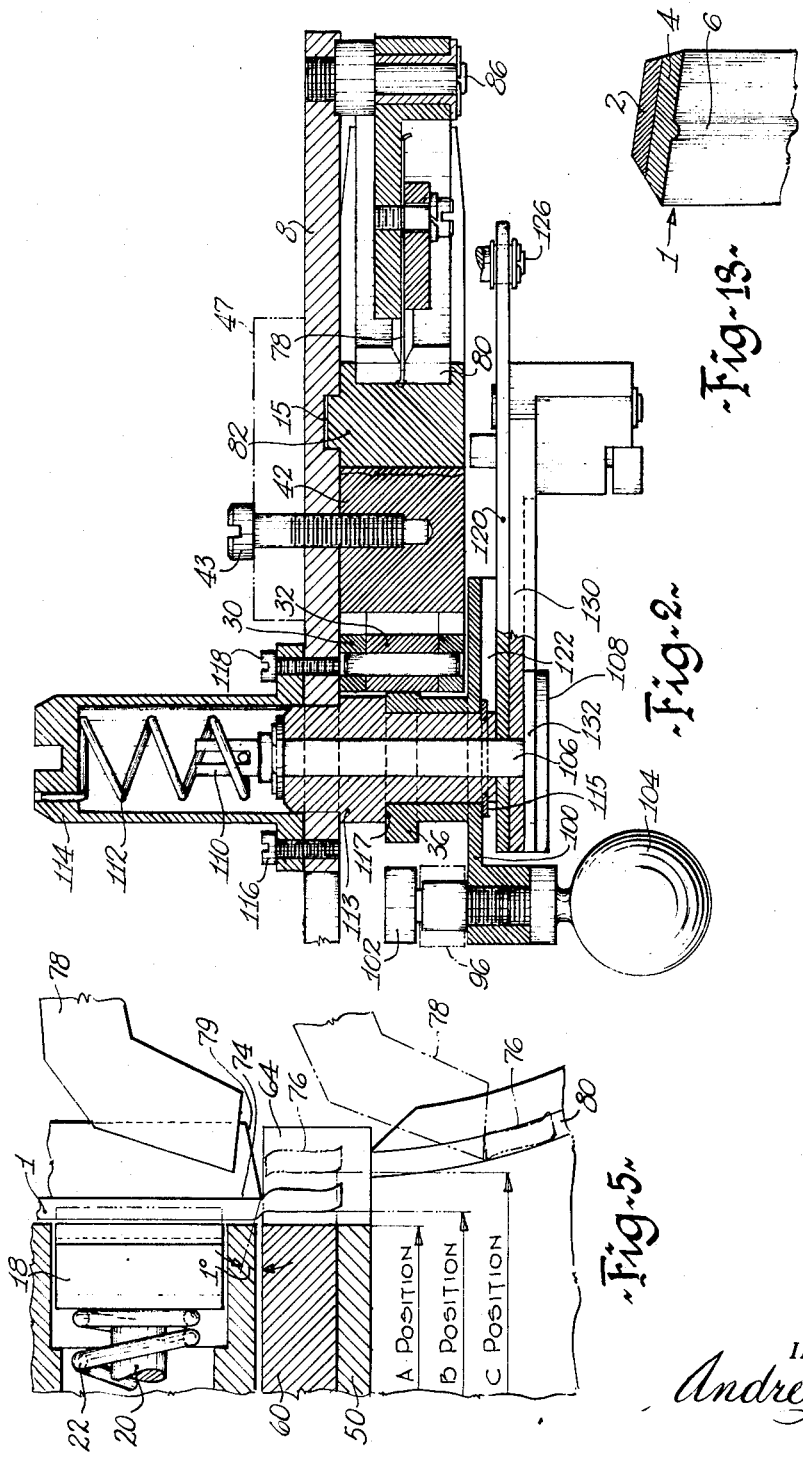

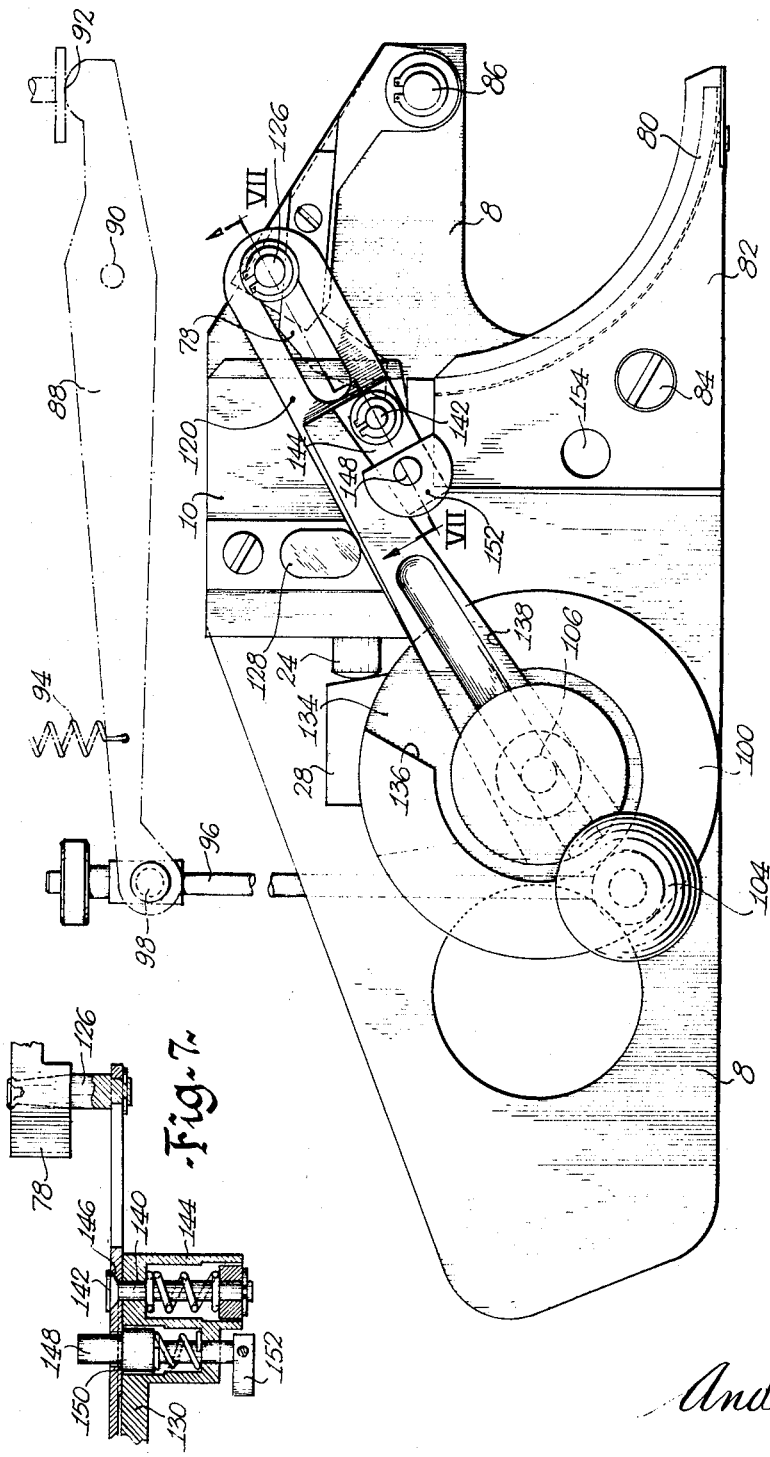

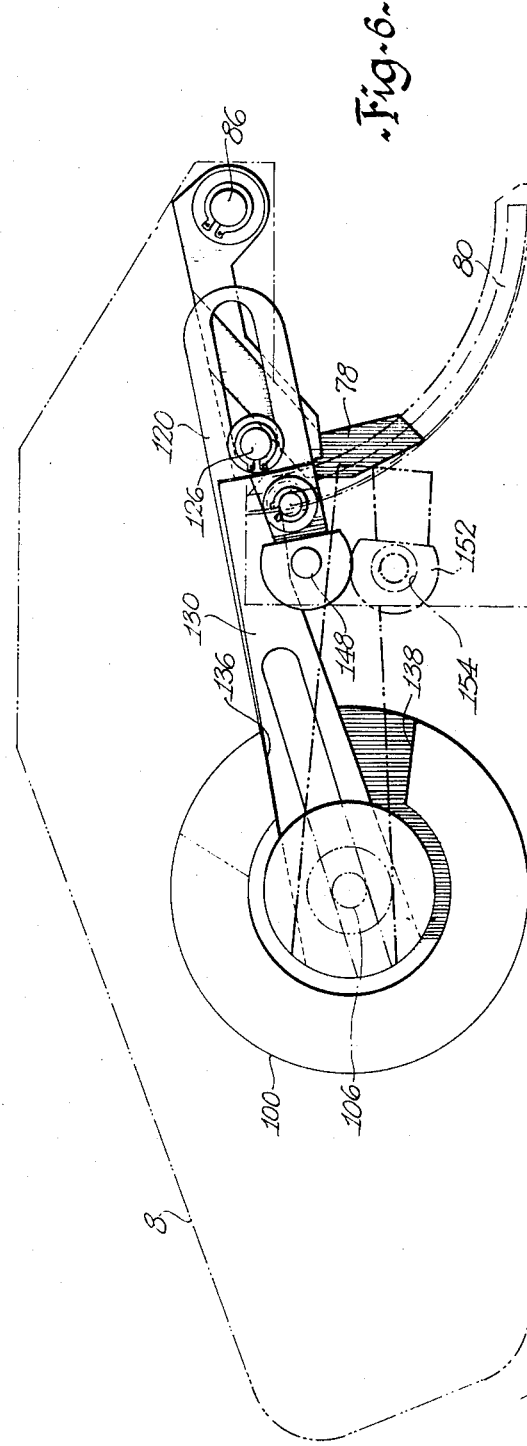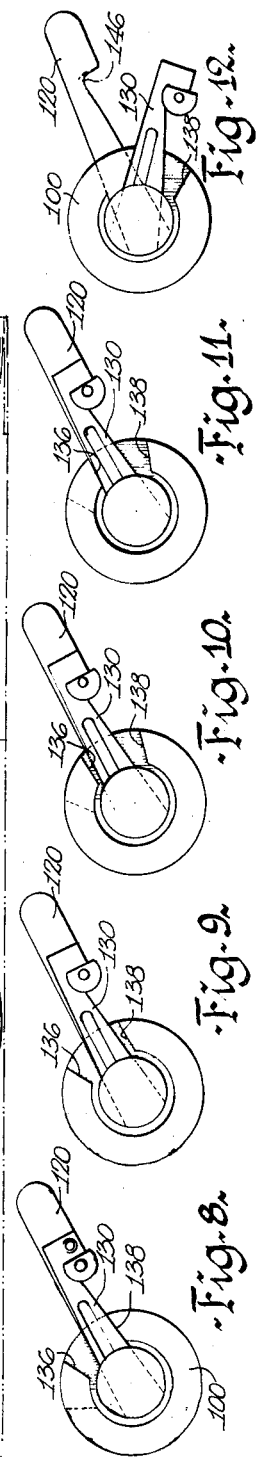

TAPE-CUTTING AND CONTACT FEED MECHANISM

This invention relates to a novel cutting and feeding device. In particular the invention relates to a device for cutting very small contacts from a feed strip with a minimum of burring and of closely controlled length, and subsequently moving the pieces around a 90° curved track to feed the pieces to a welding operation in a desired orientation.

One of the principal difficulties of cutters according to the prior art is the formation of burrs on the contact pieces. These burrs become significantly more important as the size of the contact pieces decreases and often cause jamming in the guides to the welding electrodes. As technology advances and printed circuits and the like become smaller there is a need for an even smaller and more accurately dimensioned contact, which must be welded to the relay circuit. Machine speeds increase so that it is necessary to feed the contact to the welding electrode stations at speeds of up to about 200 parts per minute or even more, without jamming in the guide. In some cases the contact pieces are required to be as small as 0.034 inches long and high-speed handling of such pieces is relatively difficult. The handling problem is compounded somewhat because the pieces must be presented to the welding electrode in a precise orientation. Most contact pieces are composite materials, such as bonded nickel-palladium tape. Palladium is required for long wear on the electrical contact surface and the nickel provides a firm and relatively inexpensive substrate which can be welded to the circuit. It is therefore necessary to present the palladium surface uppermost to the welding electrode, as will be described in more detail hereinafter. Many shapes and types of wire or strip contact materials may be processed in the present device with only minor modifications to the shape of the cutter and guides, and the present disclosure is therefore not to be construed as being limited to any particular shape or size of contact feed material.

It is an object of the present invention to provide a device which will accurately cut small pieces from a strip or wire of feed material, with a minimum of burr, and feed the small pieces in a predetermined orientation to a subsequent process operation, such as welding, at high speeds and with a minimum of jamming.

It is another object of the present invention to provide a relatively high-speed cutting and feeding device for cutting and feeding small pieces of material which is provided with a safety interlock which will prevent damage to the driving mechanism, the knife edges or the feeding device in the event of jamming of any part, double feeding or the like.

In accordance with one embodiment of the invention, as applied to the cutting and feeding of contact material to a welding operation, there is provided a frame on which a straight and a curved guide means are mounted to provide a material flow path through the device; a clamping means to releasably clamp a strip of feed material in the straight guide means; a cutter, between the straight guide and the curved guide, to cut predetermined lengths of material from the strip while it is firmly clamped in the straight guide, and advance the cut piece into the curved guide means; finger means, synchronized with the cutting operation, to urge the cut piece around the curved guide for delivery to the contact welding position.

Other objects and advantages of the invention will become apparent by reference to the following detailed description and the accompanying drawings which illustrate a preferred embodiment of the invention and in which:

FIG. 1 is a side sectional elevation of the invention.

FIG. 2 is a plan view of the embodiment of FIG. 1, in section along line II—II.

FIG. 3 is a side elevation of the embodiment of FIG. 1 showing the driving mechanism.

FIG. 4 is a plan view of the section IV—IV of FIG. 1, showing the oscillating cutter blade, and is located on the sheet containing FIG. 1.

FIG. 5 is a schematic section of the cutting device of FIG. 1, showing the movement of the cutting knife and finger from rest to transport position. FIG. 5 is located on the sheet containing FIG. 2.

FIG. 6 is a side elevation of the one embodiment of the invention showing the oscillating lever movement, synchronizing mechanism for the finger device, and safety interlock.

FIG. 7 is a plan view on line VII—VII of FIG. 3 showing the safety interlock mechanism, and is located on the sheet containing FIG. 3.

FIGS. 8–11 are schematic sketches showing the relative positions of the oscillating drum and oscillating lever in the rest, clamping, shearing and transfer positions of the lower cutting knife.

FIG. 12 is a schematic sketch showing the safety interlock actuated by a jam or stoppage.

FIG. 13 is a sketch of a cross section of a preferred strip feed to the device, and is shown on the sheet containing FIG. 2.

The present apparatus, shown in FIG. 1 is designed to cut small segments from about 0.034 inches to about 0.25 inch long from a strip of feed material 1, fed into the guides above the cutters. The strip is fed from a supply reel (not shown) by a synchronized feeding device known to the art (not shown). The strip 1 is shown in a preferred cross section in FIG. 13. A palladium layer 2 is bonded, by known means, to a nickel substrate 4 and drawn to strip or wire. The strip is substantially flat but preferably has sloping sidewalls so that the exposed palladium surface is smaller than the exposed nickel surface. The exposed nickel surface is provided with a projecting head 6 which is intended for use as a weld bead. It will, of course, be appreciated that many other cross section wires or strips may be processed and that the presently described embodiment is merely illustrative and not limiting.

FIGS. 1, 2 and 3 show a frame 8 upon which is mounted a straight guide 10–12 into which strip 1 may be fed. The two guide members 10 and 12 are held in proper relationship to each other by screw 14, which may be released to facilitate replacement, repair and cleaning. Block 10 is secured to frame 8 by screws 11 and 13 and is located in a slot 15. A clamping device shown generally as 16 is mounted within the guide block 10 and comprises a clamping piece 18 (FIG. 5) mounted on a shaft 20. A resilient means, such as a light spring 22 is placed around shaft 20 between clamping piece 18 and an endcap 24 which is a sliding fit in block 10 and into which shaft 20 may slide. Cap 24 is provided with a relief passage 26 so that shaft 20 may slide freely. Light clamping pressure is transmitted to piece 18 via the shaft 20 and endcap 24 from the lateral movement of block 28 which is integral with a reciprocating lever arm 30, pivoted at 32. Lever arm 30 is provided with a roller 34 which is urged against a driven cam 36, by the action of a spring 38 on the lever arm 30. The driving mechanism will be described in more detail hereinafter. Spring 38 is mounted in a housing 40 sliding in a block 42 rigidly mounted on frame 8 by bolts 43 and 45. Bolts 43 and 45 also serve to secure frame 8 of the device to a massive machine frame shown in skeleton at 47 in FIG. 2, so that the present invention may be rigidly installed on a production line installation. An oscillating cutter, indicated generally as 44, is detachably secured to block 28 by a pair of setscrews 46 (FIGS. 1 and 4) secured in cutter block 48. A shaped spacer piece 50 which slides in guide tracks 51 in block 10, as shown in the rest position A in FIG. 5 and in FIG. 4, is provided with shoulders 52 which are resiliently urged against shoulders 54 in block 48 by a spring 56 in housing 58. The opposite end of spacer 50 is provided with a slot into which a "Carballoy 55B" (Registered Trademark) cutter 60 is inserted. Inserts 60 may be turned over or turned end for end to provide four cutting edges between each regrinding operation. Preferably a pair of recesses 62 are provided along the slot to facilitate lifting rotation and removal of the Carballoy cutter inserts 60. A pair of shaped guide pieces 64 are provided around cutter 60. Preferably cutter 60 is shaped to accommodate the weld head 6 of the feed strip 1. During the forward motion of block 28 to the clamping position, block 48 advances, compressing a relatively weak spring 56 which transmits an additional clamping pressure to the feed material 1 via the cutter 60. As the block 48 continues to advance the surfaces 66 and 68 come into contact, the force on cutter 60 increases and shearing of the strip feed material 1 occurs (Position B). As soon as shearing of the strip has occurred, the tension in spring 56 is released and spacer piece 50 shoots forward along guide 51 to the transfer position C in which the face 70 of the spacer piece 50 abuts stop 72. At this point the lever arm 30 remains stationary by the contained clockwise rotation of cam 36 before commencing the return motion drawing block 48, the spaces piece 50 and cutter 60 back to the rest position A. As shown in FIG. 5, the shearing of the feed strip material 1 occurs between the horizontally moving cutter blade 60 and a vertical stationary blade 74 which is inserted in a step in guide member 12. Blade 74 is retained in position in the guide member 12 and by guides 64 which prevent vertical movement. Blade 74 may be turned end for end to provide two cutting edges between regrinds. The spacing between the moving cutter 60 and the guide block 10 and the relationship of the cutter 60 to the fixed cutter 74 is of some importance in maintaining a minimum burr in the severed contact segment 76. It has been found preferable to maintain the distance between guide 10 and cutter 60 to between about 0.0003 inch and 0.0005 inch to provide for sliding clearance and minimum burr. It will be appreciated that the lowest point of cutter 74 must be aligned as closely as possible with the upper surface of cutter 60, and it has been found that burring is minimized if cutter 74 is provided with a slightly sloping lead in face, of the order of 1° towards the lowest point. For ease of removing cutting debris and cleaning, the trailing face 79 may be cut away at an angle of about 15°–30° to the horizontal. It is believed that pressure exerted by spring 56 against the feed strip 1 before cutting and the carefully controlled face angle of the stationary cutter is at least partly responsible for the substantially burr-free formation of the contacts 76. It will, of course, be appreciated that FIG. 5 is in sketch form only and that the burr formation therein is not in proportion, being exaggerated for the sake of clarity.

As previously described, immediately the shearing action is complete, spring 46 exerts a forward pressure on cutter 60 so that it advances to position C and ejects segment 76 from the cutting plane. In addition, the motion of cutter 60 between position B and position C cleans the cutting plane of cutting dirt and debris which is an added advantage in that this reduces the possibility of jamming or excessive wear on the cutting edges.

As the segment 76 is moved to the C position, a finger arm 78 simultaneously commences a downward movement to urge the segment into and around a curved track 80 mounted on a block 82 which is secured on frame 8 by screw 84. Finger arm 78 is pivoted from a pivot 86 of frame 8 and is preferably driven via a linkage, to be described hereinafter, from the same drive means which operates lever arm 30. Track 80 is a quadrant of a circle so that the contact segment 76 is turned through an angle of 90° in traversing the track, thus presenting the contact segment 76 in the desired orientation to the succeeding operation which is normally a welding operation to a contact substrate of strip presented transverse to the flow path of the segment 76 through the cutter and feeder.

Turning now to the drive mechanism for the cutter and feeder finger, which in the preferred embodiment, is driven from a single source, FIG. 3 shows in chain link an oscillating lever arm 88 pivoted about a pin 90 and reciprocated from a source (not shown) at an end 92 against a resilient spring 94, thereby providing a vertical reciprocating motion to the connecting rod 96 which is pivotally mounted to lever arm 88 at pivot pin 98 and pivotally mounted to a reciprocating wheel disc 100 at a headed pivot pin 102. Pivot pin 102 extends through disc 100 and is provided at the outer side with a knob 104 which facilitates hand operation of the device in the event of jamming or the like.

Wheel disc 100 is axially mounted on frame 8 on an axial pin 106 which has an upset outer end 108 and an opposed end 110 which is provided with a slot into which one end of a torque spring 112 is fitted. An axial bushing 113 is also provided in which pin 106 is free to move. The other end of spring 112 is secured to a spring housing 114 which is mounted on frame 8 by bolts 116 and 118.

Wheel disc 100 is free to move reciprocably through an arc of about 90° about axial bushing 113, which is securely mounted on frame 8. It will be noted that wheel disc 100 does not rotate about the bushing 113, for reasons which will be apparent hereinafter. The collared end 110 of pin 106 is retained in contact with bushing 113 by the action of spring 112. Wheel disc 100 is held in place on bushing 113 by a spring circlip 115 and abutting surfaces 117.

The reciprocating action of wheel disc 100 causes a lateral reciprocating action of lever 30 by contact of cam 36, which is an integral part of disc 100 and hence mounted on the same axial pin 106 in bushing 113 with the roller 32 on lever 30, thus effecting the drive for the clamp and cutter action hereinbefore described.

A lever arm 120 is inserted into a circumferential segmental slot 122 in disc 100 so that it may be freely pivotally mounted on pin 106 and so that disc 100 may reciprocate without engaging with the lever arm 120. The end of arm 120 remote from pin 106 is provided with an elongated slot 124 in which a link pin 126 may slide. Link pin 126 connects arm 120 to finger arm 78 so that finger arm 78, pivoted at 86, may be reciprocated in track 80.

FIG. 3 shows link 126 at the outward end of slot 124 and finger 78 above the track 80. FIG. 6 shows link 126 at the inward end of slot 124 and finger 78 travelling in track 80. It will be noted, however, that arm 120 is freely pivoted on pin 106 and hence does not transmit any power from crankshaft 96 to the finger 78. Arm 120 merely guides and limits the motion of finger 78. A stop 128, of any suitable material such as nylon, on block 10 is provided to limit upward movement of arm 120 on its return to the rest position of FIGS. 3 and 6.

Drive is transmitted to arm 120 by a second lever arm 130 which is keyed to upset end boss 108 by key 132. Clockwise movement of arm 130 causes torque to be applied to torque spring 112 which, upon removal of the applied force, tends to move arm 130 anticlockwise (or upwards) to the rest position shown in FIGS. 3 and 8 and maintain contact with lever arm 120. Lever 130 is positioned in a recessed segment 134 of the outer face of wheel disc 100, and wheel disc 100 is free to move independently of lever 130 between the limits of the faces 136 and 138 of the segment recess.

The outer or free end of arm 130 is provided with a safety interlock as shown in FIG. 7. A spring-loaded pin 140 having a chamfered head 142 is provided in a housing 144. Chamfered head 142 is engaged in a contoured recess 146 (FIGS. 7 and 12) in arm 120 so that, under normal operating conditions, spring-loaded pin 142 holds arms 120 and 130 in superposed relationship. A second spring-loaded pin 148 is also provided in housing 144, this second pin having shoulders 150 which abut the lower edge of arm 120, which abutment prevents pin 148 from protruding from housing 144 to the full extent allowed by the length of the pin and a stop member 152. The purpose of second pin 148 will be described hereinafter.

In operation, at the start of a cycle the clamping and cutting device is in position A as shown in FIG. 5 and disc 100 is in the position shown in FIG. 8 with arm 130 abutting face 138. As connecting rod 96 moves upward lever 30 moves block 28 forward to the clamping position 13, simultaneously disc 100 moves to the position shown in FIG. 9. As movement continues shearing occurs and disc 100 moves to the position shown in FIG. 10. Blade 60 shoots forward to position C (FIG. 5) as disc 100 moves to the position shown in FIG. 11 with face 136 abutting the upper surface of arm 130. Continued movement of disc 100 causes arms 120 and 130 to rotate clockwise about pivot 106 by the pressure of face 136 on arm 130. Link pin 126 slides downwardly in slot 124 driving finger 78 into guide 80 and pushing segment 76 around the guide. As the rod 96 starts its downward movement the sequence is reversed and arm 130 rises by the action of torque spring 112 so that it maintains contact with face 136 until stop 128 is reached and then disc 100 moves back to the rest position shown in FIG. 8. The cycle can then be repeated.

In the event that the cutters jam or the finger 78 jams in the track 80 and the downward motion of arm 120 is stopped, the safety interlock comes into play to prevent damage to the driving mechanism or the cutter and feeder. The head 142 of pin 140 rides out of recess 146 in which it is normally located as face 136 continues to push arm 130 downwards. Shoulder 150 disengages with the edge of arm 120 and spring-loaded pin 148 extends under the action of the spring so that the end of pin 148 slides over the face of block 82, as the downward motion continues until pin 148 is in axial alignment with a lockhole 154. Pin 148 enters hole 154 and remains firmly locked therein until stop member 152 is withdrawn by hand against the action of the spring. Thus a positive breaking and locking action is achieved. Disc 100 can continue to reciprocate under the action of the drive from shaft 96 but no drive is transmitted to finger 78. As soon as a stoppage occurs the operator can quickly visually inspect the apparatus to ascertain the cause of the jam. Most usually jams are caused by double feeding of a segment into the curved track or by turning of a segment in the curved track. Such jams are easily cleared by manually operating finger 78, without stopping drive shaft 88. Alternatively an airjet may be used to blow an obstruction clear. The machine may then be reset by withdrawing pin 148 from hole 154, raising arm 130 into superimposed relationship with arm 120 and reinserting head 142 in recess 146.

As will be appreciated many modifications to the apparatus are possible and will readily suggest themselves to those skilled in the art. For example, a synchronized, but separate, drive for the finger 78 may be employed. Alternatively two or more cutters and finger guides could be operated in parallel from a single drive means.

The embodiments of the invention in which an exclusive property or privilege is claimed are defined as follows:

1. A combination cutting and feeding device comprising a straight first guide means and a curved second guide means defining a material flow path through said device; means to releasably clamp a strip of feed material in said first guide means; means between said first guide means and said second guide means to cut a predetermined length from the end of said strip and transfer said length into said curved second guide means, when said strip is clamped in said first guide means; finger means adapted to be moved into said flow path and along said curved second guide means; and operating means to move said finger means into said flow path and along said curved second guide means when said length is transferred into said second guide means, whereby said length is urged along said curved second guide means to an exit from said flow path.

2. A cutting and feeding device as claimed in claim 1 including drive means operatively connected to said clamping means and said cutting means.

3. A cutting and feeding device as claimed in claim 2 wherein said finger means is pivotally mounted on a frame and operatively connected to said drive means.

4. A cutting and feeding device as claimed in claim 2 wherein said drive means is a reciprocating drive means.

5. A cutting and feeding device as claimed in claim 2 wherein said drive means comprises a reciprocating drive shaft; a cam means axially mounted on a frame and operatively connected to said drive shaft, and a lever means pivotally mounted on said frame and resiliently urged against said cam means; said lever means being resiliently associated with said clamping means whereby said clamping means may reciprocate in said frame between a rest position and a clamping position; said lever means also being detachably secured to said cutting means whereby said cutting means may reciprocate in said frame parallel to said clamping means and between a rest position an intermediate cutting position and a material transfer position.

6. A combination cutting and transfer device comprising a rigid frame; a straight first guide track member and a curved second guide track member detachably mounted on said frame and defining a material flow path through said device; clamping means, resiliently mounted in said frame transverse to said material flow path, adapted to releasably clamp a strip of feed material passing along said flow path against said first guide member at predetermined intervals; a fixed cutting member detachably mounted in said frame parallel to said flow path downstream of said clamping means; a reciprocating cutting member mounted in said frame transverse to said flow path, and cooperating with said fixed cutting member to sever a predetermined length from said feed strip when said strip is clamped to said first guide member, said reciprocating cutting member moving between a rest position out of said flow path, a cutting position in said flow path and a transfer position out of said flow path and remote from said rest position, said reciprocating cutting member being adapted to transfer said predetermined severed length into said curved guide track member; a finger member pivotally mounted on said frame and adapted to slide in said curved guide track and urge said severed lengths along said curved guide track to a fixed delivery point from said flow path; and driving means operatively connected to said clamping means, said reciprocating cutting member and said finger member.

7. A combination cutting and feeding device as claimed in claim 6 wherein said driving means comprises: a driven reciprocating means mounted on an axis; a cam mounted on said axis and cooperating with said reciprocating means and a first lever, pivotally mounted on said frame, to provide a reciprocating linear motion to said clamping means and said reciprocating cutting member; and operating means including a second lever, pivotally mounted at one end on said axis and slidably connected to said finger member at its other end, operatively connected to said reciprocating means whereby said means transmits an arcuate reciprocating motion to said pivoted finger member which is synchronized to follow said linear reciprocating motion of said clamping and cutting members.

8. A combination cutting and feeding device as claimed in claim 7 wherein said operating means includes a third lever pivotally mounted on said axis and driven by said reciprocating means, releasably connected to said second lever, whereby said arcuate reciprocating action is transmitted to said finger member.

9. A combination cutting and feeding device as claimed in claim 8 wherein said third lever includes a first spring-loaded connecting pin adapted to releasably engage in a recess in said second lever whereby said arcuate reciprocating motion is transmitted from said driven reciprocating means to said finger means and wherein said pin disengages from said recess in the event said cutting member or said finger member fail to operate.

10. A combination cutting and feeding device as claimed in claim 9 including a second spring-loaded pin adapted to engage a recess in said frame and secure said third lever thereto when said first spring-loaded pin disengages from said recess in said second lever whereby transmission of said arcuate motion from said reciprocating means to said finger member is prevented.

11. A combination cutting device as claimed in claim 1, wherein said cutting means includes: a reciprocating drive member having a recess and a pair of internal shoulders associated therewith; an elongated space member having, at one end thereof, a head portion adapted to be slidably engaged in said recess, and at the other end thereof, a cutter insert; said spacer member being adapted to slide longitudinally in a third guide between a rest position and an extended position; and resilient means in said recess urging said head portion against said shoulders when said spacer is in said rest position; said head moving out of contact with said shoulders as said drive member and said spacer are advanced from said rest position toward said extended position and said cutter insert abuts said feed strip in said device whereby energy is stored in said resilient means, said energy being suddenly released when said cutter in combination with a fixed cutter in said first guide cuts said feed strip so that said head again contacts said shoulders and said spacer is advanced to said extended position.

12. A combination cutting and feeding device as claimed in claim 11 wherein said resilient means comprises a compression spring.

13. A combination cutting and feeding device as claimed in claim 11 including a stop means in said third guide to limit forward movement of said spacer.

14. A cutting device comprising: a reciprocating drive member having a recess and a pair of internal shoulders associated therewith; an elongated spacer member having, at one end thereof, a head portion being adapted to be slidably engaged in said recess; a cutter blade adapted to be inserted into said spacer at the other end thereof, said spacer being adapted to slide longitudinally in a guide between a rest position and an extended position; and resilient means in said recess urging said head against said shoulders when said spacer is in said rest position; said head moving out of contact with said shoulders as said drive member and said spacer are advanced from said rest position toward said extended position and said cutter blade abuts a feed strip to be cut whereby energy is stored in said resilient means; said energy being suddenly released as said cutter blade severs said feed strip whereby said spacer and said blade are advanced to said extended position and said head again contacts said shoulders.

15. A cutting device as claimed in claim 14 wherein said resilient means is a compression spring secured in said recess.

16. A cutting device as claimed in claim 14 including a stop means in said guide to limit forward movement of said spacer to said extended position.

17. A cutting and feeding device as claimed in claim 3 wherein said drive means is a reciprocating drive means.

18. A cutting and feeding device as claimed in claim 3 wherein said drive means comprises a reciprocating drive shaft; a cam means axially mounted on a frame and operatively connected to said drive shaft, and a lever means pivotally mounted on said frame and resiliently urged against said cam means; said lever means being resiliently associated with said clamping means whereby said clamping means may reciprocate in said frame between a rest position and a clamping position; said lever means also being detachably secured to said cutting means whereby said cutting means may reciprocate in said frame parallel to said clamping means and between a rest position an intermediate cutting position and a material transfer position.

19. A cutting device as claimed in claim 15 including a stop means in said guide to limit forward movement of said spacer to said extended position.

* * * * *